3,541,696
VAPOR LEVEL CONTROL FOR WATER-DRYING ARTICLES WITH HIGH-BOILING SOLVENTS
James L. Dunn, Jr., Lake Jackson, Tex., assignor to The Dow Chemical Company, Midland, Mich., a corporation of Delaware
Filed July 1, 1968, Ser. No. 741,396
Int. Cl. F26b 3/00
U.S. Cl. 34—27                                 1 Claim

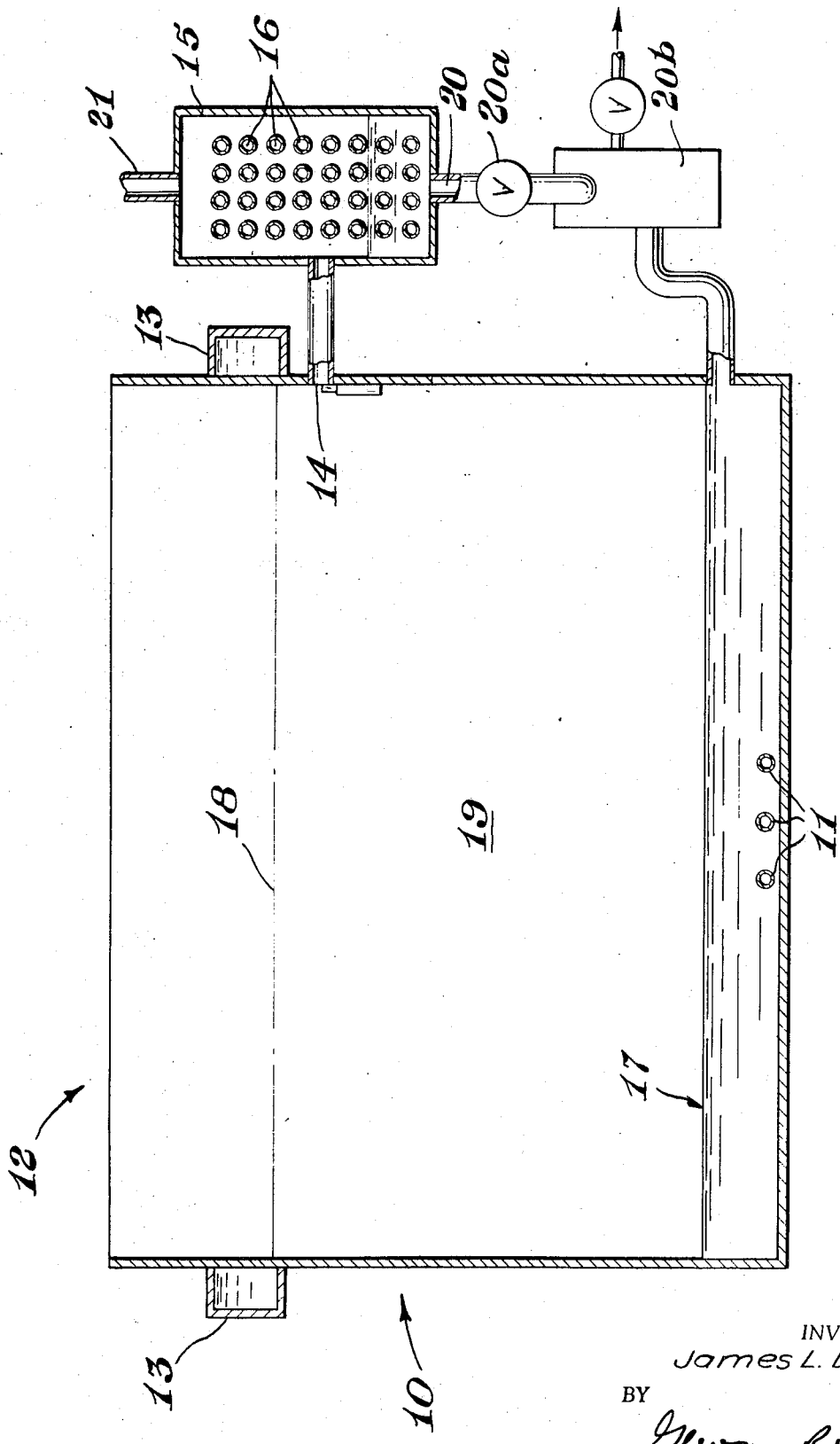

ABSTRACT OF THE DISCLOSURE

A method for removing water from articles by placing the article into the vapors of a solvent which has a boiling point higher than that of water, withdrawing the water vapor and solvent vapor from the vicinity of the article and passing the water vapor and solvent vapor to a chamber having only an air vent to the atmosphere, condensing the water vapor and solvent vapor in the chamber, separating the condensate water from the solvent and returning the solvent to the process.

BACKGROUND OF INVENTION

Conventional apparatus used to dry water wetted articles with high boiling vaporizable solvents permits the loss of solvent from the apparatus. The loss of solvent vapor is attributable primarily to a redistillation phenomenum which occurs at the vapor-level control means. The vapor level control means generally constitutes a coil or coils surrounding the interior walls of the apparatus near the opening in the apparatus through which work is introduced and withdrawn. Cold water is passed through these coils causing the solvent and water vapors to condense thereon. The water and solvent each condense and mix on the coils producing a condition which will distill the azeotropic mixture from the condensate. This azeotrope disperses above the vapor level and mixes with air producing a gas having a lighter density than the water or solvent vapors. This lighter density gas escapes from the vicinity of the vapor level control means and is lost to the surrounding atmosphere. Each such escape creates a turbulence within the vapor level control means zone introducing air into the zone which further increases the turbulence and thus the escape of solvent vapors.

BRIEF DESCRIPTION OF INVENTION

The present invention concerns a method and apparatus for drying metal and plastic articles or parts which have been wetted by water during processing by subjecting in a vapor zone the wetted article or part to the vapors of a chlorinated solvent having a boiling point above the boiling point of water. The water is vaporized when the part is contacted with the chlorinated solvent vapors and the resulting mixture of vapors is continuously withdrawn from the vapor zone through an opening in the side of said vapor zone (below the vapor-level) into a condensing chamber independent of said vapor zone. The vapors, both water and solvent, are condensed in the chamber. The condensate is withdrawn to a water separator, the water and solvent separated and the solvent returned to the process. The present process establishes a vapor-level which can be controlled as well as eliminating the mixing effect at condensing coils placed in the vapor zone. This chamber contains an efficiently designed condenser to prevent back mixing of air and solvent vapors. The chamber confining the redistillation effect to a small zone open only to the air through a small opening materially reduces the loss of solvent.

DETAILED DESCRIPTION OF INVENTION

The following description of the present invention has particular reference to an apparatus illustrated in the drawing. For convenience the apparatus will be described first. The drawing shows the cross-section of an apparatus for drying metal or plastic parts by introducing the water-wetted part into the vapors of, for example, perchloroethylene or other high boiling solvents. The apparatus comprises generally a box-like open top chamber 10. The chamber is provided with a liquid heating means 11 illustrated as steam coils in the bottom of the chamber. Around the outside walls of the chamber near the open top 12 is a single pass jacket 13 through which water or other cooling fluid is passed. The jacket 13 cools the walls so that the chamber walls will not be heated above the vapor zone established in the chamber 10 in the vicinity of the jacket 13. At a point in one or more walls of the box-like chamber 10 is an opening 14 connecting the interior of the chamber 10 with a condenser 15 typical of shell and tube heat exchanger having a multiplicity of coils 16 through which a cooling liquid can be passed and a shell surrounding the coils into which the vapors are contained until condensed.

The condensing chamber 15 also has an outlet 20 in its bottom connecting it to a water separator 20b and an atmospheric vent 21 in its top.

In operation of the apparatus the boiling sump 17 is filled with solvent, such as perchloroethylene, to cover the heating coils 11 with sufficient liquid to provide a vapor atmosphere to fill the interior of the chamber 10 to a predetermined level 18 in the vicinity of the jacket 13 which is supplied with cooling water. Water or other cold fluid is passed through the condensing coils 16 in condenser 15. The solvent vapors enter the condenser 15 through an opening 14 from the interior of the chamber 10 to the condenser 15. The opening 14 is adjustable to enable maintenance of the vapor level in the chamber at the desired level. Parts (not shown) are introduced into the vapor zone 19 where the heat of the solvent vapors raises the temperature of the part to above the boiling point of the water. The water vapor dispersed in the solvent vapors and the solvent vapors both are drawn by the condenser 15 wherein both the vapors of the water and solvent are condensed. The condensed liquids are withdrawn through pipe 20 and 20a to a water-separator 20b, and returned to the boiling sump 17.

The operation of the apparatus in the method of the present invention substantially prevents air entering the condensing zone with the attendant loss of vapors from the vapor zone. Further, any air which does enter the condensing chamber 15 is vented to the atmosphere through vent 21 under controlled conditions reducing if not eliminating the loss of solvent vapors.

Solvents which are used in present-day drying processes can be employed more economically in accordance with the present invention than in conventionally designed apparatus. Solvents which are employed in these processes are the chlorinated solvents such as perchloroethylene, the fluorinated solvents, toluene, xylene and the like.

I claim:

1. In a method for removing water from a drying process wherein a water-wet part is introduced into a chamber containing vapors of an organic solvent having a boiling point above that of water, and wherein the water and solvent vapors are condensed, separated and the condensed solvent vapors returned to a vapor generating means, the improvement which comprises removing the water by withdrawing a mixture of solvent and water vapors from the vapor chamber through an opening in the wall into a condensing zone separate from said chamber and having a series of condensing coils and a vent to the atmosphere, condensing said mixture of vapors therein, separating the water and solvent and returning the solvent to the process.

References Cited

UNITED STATES PATENTS

| | | | |
|---|---|---|---|
| 2,074,508 | 3/1937 | Hetzer | 34—77 X |
| 3,048,929 | 8/1962 | Kremen | 34—77 X |

EDWARD T. MICHAEL, Primary Examiner